J. S. WASHBURN.
AUTOMATIC BRAKE ADJUSTER.
APPLICATION FILED NOV. 19, 1909.
974,004.
Patented Oct. 25, 1910.
2 SHEETS—SHEET 1.
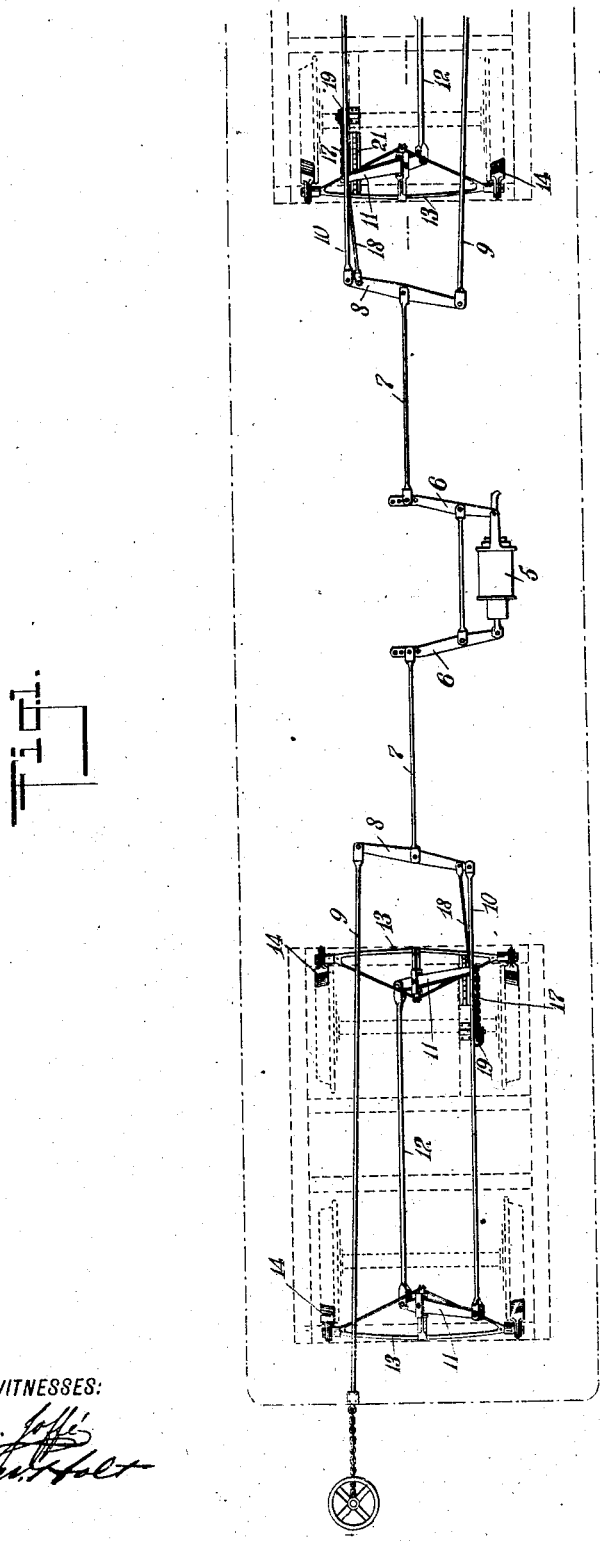
WITNESSES:
INVENTOR
John S. Washburn
BY
ATTORNEYS J. S. WASHBURN.
AUTOMATIC BRAKE ADJUSTER.
APPLICATION FILED NOV. 19, 1909.
974,004.
Patented Oct. 25, 1910.
2 SHEETS—SHEET 2.
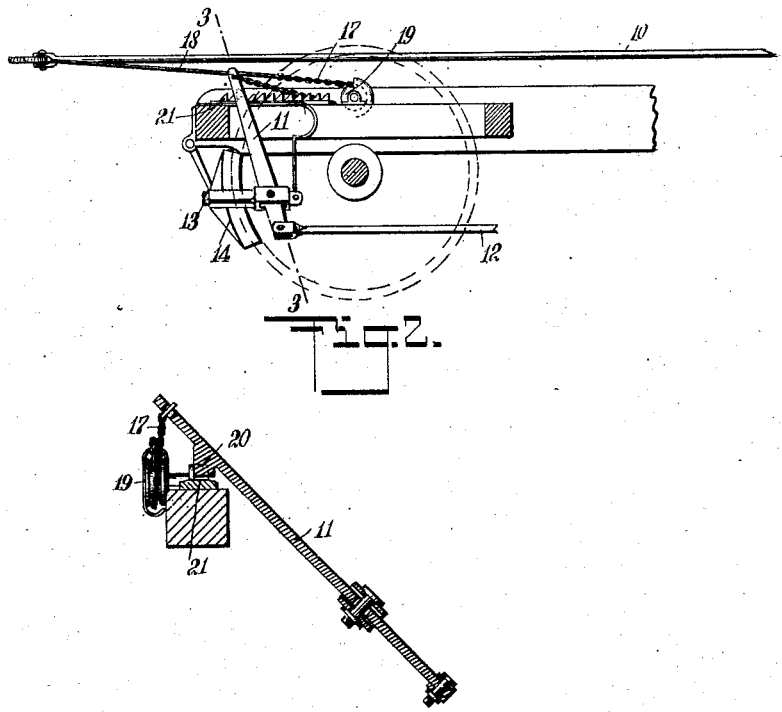
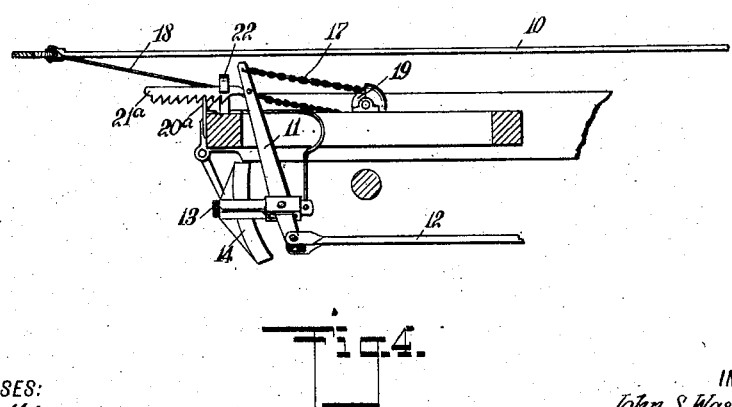
WITNESSES:
INVENTOR
John S. Washburn
BY
ATTORNEYS

UNITED STATES PATENT OFFICE.

JOHN SHAVER WASHBURN, OF ALBANY, NEW YORK.

AUTOMATIC BRAKE-ADJUSTER.

974,004.  Specification of Letters Patent.  Patented Oct. 25, 1910.

Application filed November 19, 1909. Serial No. 528,863.

*To all whom it may concern.*

Be it known that I, JOHN SHAVER WASHBURN, a citizen of the United States, and a resident of Albany, in the county of Albany and State of New York, have invented a new and Improved Automatic Brake-Adjuster, of which the following is a full, clear, and exact description.

The invention is an improvement in automatic brake adjusters, and has in view to simplify the construction of this character of devices and render them positive in action, the adjuster embodying pawl and ratchet members, with one of the members carried by the frame of the truck and the other connected to the brake-lever and arranged to be engaged by the first member and lock the lever in successive positions, the lever being operatively connected at the opposite sides of its fulcrum to the opposite ends of the brake-rod of the usual brake mechanism.

Reference is to be had to the accompanying drawings forming a part of this specification, in which similar characters of reference indicate corresponding parts in all the views.

Figure 1 is a plan of a conventional type of braking mechanism having my improvement applied thereto; Fig. 2 is a side view of the same, showing a portion of the truck in vertical section; Fig. 3 is a section on the line 3—3 of Fig. 2; and Fig. 4 is a view similar to Fig. 2, showing a modification of the construction.

In Fig. 1 I have shown a well-known form of brake arrangement as applied to a car, the same comprising the intermediate brake cylinder 5, brake levers 6, connecting rods 7, floating levers 8, hand brake rods 9, brake rods 10, brake levers 11, connecting rods 12 and brake beams 13 having the brake shoes 14, the brake levers being fulcrumed intermediate their lengths to the brake beams, with one lever of each truck, generally the outer lever, connected to the adjacent floating lever by the rod 10 and to the other lever at the opposite side of the fulcrum by the rod 12. The brake lever farthest removed from the brake cylinder in passing through the system of leverage, is connected either to the adjacent floating lever or the brake rod 10 adjacent to or coincident with the connection between the brake rod and floating lever, by a chain or other flexible member 17, and a rod 18, the chain passing around a pulley or sheave 19 fixed at a point inwardly of the truck. The braking lever 11 at a point close to its connection with the chain 17, is constructed with a fixed tooth 20, arranged to engage the teeth of a ratchet-bar 21 secured to the truck, as shown in Figs. 2 and 3, the teeth of the ratchet-bar being constructed to permit of the upper portion of the lever moving inwardly under the pull of the chain but locking the same against motion in the opposite direction.

In the application of the improvement to the brake arrangement, it is adjusted at the outset so that the brake shoes will stand the requisite distance from the wheels when the brakes are off. As the shoes wear under the repeated application of the brakes, the brake rod obviously travels farther in applying the shoes to the wheels. When this further travel of the brake rod is sufficient to cause the tooth of the brake lever to pass over the top of the adjoining tooth, the brakes when released will leave the shoes standing from the wheels at the same distance as when the shoes were new; thus, the adjustment of the shoes is continued as they are worn, without changing the leverage of the brakes or requiring this work to be in any wise manually performed, as, for example, by adjusting the connections between the brake cylinder levers and the connecting rods 7, as is the general practice.

In Fig. 4 I have shown a modified construction of my improvement, which is in all respects the same as that just described, except the ratchet-bar 21ª, corresponding to the ratchet-bar 21, is carried by and pivotally supported at one end from the lever, and the tooth 20ª, corresponding to the tooth 20, is fixed to the truck. The rack-bar 21ª is limited in its upward pivotal movement by a suitable stop 22, so that it cannot be displaced by the vibration and jarring of the car.

Having thus described my invention, I claim as new and desire to secure by Letters Patent:

1. The combination of a brake rod, a brake beam having brake shoes, a brake lever fulcrumed intermediate its length and operatively connected at one side of its fulcrum to the brake rod, a sheave, a connection between the lever at the opposite side of its fulcrum and the opposite end of the brake rod passing around the sheave, and means independent of the said connection to lock the lever against movement in one direction in successive positions to compensate for the wearing of the brake shoes.

2. The combination of a brake mechanism having brake shoes and provided with a brake lever with which it is operatively connected at one side of the lever's fulcrum, a sheave, means operatively connecting the lever at the opposite side of its fulcrum to the brake mechanism and passing around the sheave, and a pawl member and a ratchet member to lock the lever against movement in one direction in the successive positions in which it is drawn in the opposite direction by the last mentioned means to compensate for the wearing of the brake shoes, with one of said members carried by the lever.

3. In combination with a car truck, a brake beam having brake shoes, a brake lever fulcrumed intermediate its length to the brake beam, a brake-operating mechanism operatively connected to the lever at one side of its fulcrum, a brake adjusting device operatively connected to the brake lever at the opposite side of its fulcrum, and a connection between that side of the brake lever having the brake adjusting device and the brake-operating mechanism, having a definite working length and arranged to automatically actuate the adjusting device and draw this portion of the lever in a direction to force the shoes to the wheels when the brakes are applied.

In testimony whereof I have signed my name to this specification in the presence of two subscribing witnesses.

JOHN SHAVER WASHBURN.

Witnesses:
    EDWIN W. SANFORD,
    EUGENE B. SANFORD.